US007146453B2

(12) United States Patent
Shyam et al.

(10) Patent No.: US 7,146,453 B2
(45) Date of Patent: Dec. 5, 2006

(54) REDUCING ABENDS THROUGH THE USE OF SECOND-TIER STORAGE GROUPS

(75) Inventors: Sanjay Shyam, Los Altos, CA (US); Stevan Charles Allen, Gilroy, CA (US); Victor S. Liang, San Jose, CA (US); Savur Anand Rao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 10/072,521

(22) Filed: Feb. 6, 2002

(65) Prior Publication Data

US 2003/0149847 A1   Aug. 7, 2003

(51) Int. Cl.
  *G06F 12/00*   (2006.01)
  *G06F 9/00*    (2006.01)
(52) U.S. Cl. ................... 711/4; 711/100; 711/112; 711/111; 714/100; 714/1; 714/2
(58) Field of Classification Search ............. 711/4, 711/100, 112, 111; 714/100, 1, 2
  See application file for complete search history.

(56) References Cited

U.S. PATENT DOCUMENTS 5,761,667 A  *  6/1998  Koeppen ................. 707/101
5,872,970 A  *  2/1999  Pickett et al. ............ 718/101
6,026,462 A      2/2000  George et al. .............. 711/2
2003/0135709 A1 * 7/2003  Niles et al. .............. 711/220

OTHER PUBLICATIONS

L. R. Stone, T. S. Nettleship and J. Curtis, "*VM/ESA CMS Shared File System*", IBM Systems Journal, vol. 30, No. 1, 1991.

* cited by examiner

*Primary Examiner*—Kimberly McLean-Mayo
(74) *Attorney, Agent, or Firm*—Harrington & Smith, LLP

(57) ABSTRACT

A method and computer that reduces ABENDs due to end of volume encounters of a job. The method provides an extend-to-new volume processing in response to such encounters. The method permits the definition of primary storage groups and extend storage groups and allows the linking of an extend storage group to a primary storage group. When the job encounters an end-of-volume condition on the current storage volume and is further unable to extend to a new volume in the primary storage group, the method then tries to find a new volume in one or more extend storage groups that are linked to that primary storage group. If no new volume can be found in an extend storage group, an ABEND process is performed.

9 Claims, 3 Drawing Sheets

| Storage Pools | Initial Allocation Normal Processing | | | Extend-to-new Volume Processing |
|---|---|---|---|---|
| Pool 1 | V11 | V12 | V13 | Primary SG1 |
| Pool 2 | V21 | V22 | V23 | Extend SG1 (also Primary SG2) |
| Pool 3 | V31 | V32 | V33 | Extend SG2 (also Primary SG3) |

Fig. 2

REDUCING ABENDS THROUGH THE USE OF SECOND-TIER STORAGE GROUPS

FIELD OF THE INVENTION

This invention relates to a method and a data processing system that performs extend processing when a job encounters an end of volume condition.

BACKGROUND OF THE INVENTION

Data processors generally run an application to process the data of a job. For example, the data for a payroll job (employee names, social security numbers, pay rates and the like) is processed by a payroll application. Sometimes jobs encounter problems during processing that cause the job to end prematurely. Such a premature end is known as an abnormal end or an ABEND. A job ABEND may occur for any one of a number of reasons, such as being unable to get more space after currently allocated space has been exhausted.

In previously known data processing systems, an end of volume encounter meant an ABEND might occur. Prior remedies included modifying the storage management program configuration to add volumes to the primary storage group or deleting data sets from the existing storage group volumes to free up space. These remedies can be labor intensive, as personnel are often needed to analyze the reasons for the ABEND and provide a fix. In addition, the lost time in completing the job can be costly to the enterprise running the job. Efforts have been made to assist in the detection, analyzing and fixing of ABENDS. For example, U.S. Pat. No. 5,872,970 describes an automated monitor that integrates a number of tools for monitoring, analyzing, fixing and restarting jobs.

However, none of the prior art tools addresses the ABEND problem caused by an inability to extend the data set on another volume in the primary pool. A solution that reduces the risk of an ABEND occurring is needed.

SUMMARY OF THE INVENTION

The method of the present invention reduces ABENDs in a data processing system by providing one or more secondary storage groups that may be used during extend processing if the primary storage group has been exhausted. In response to an end of volume encounter normal processing will select a new storage volume from storage volumes that are members of a first or primary storage group. If the primary storage group has no available storage volumes, the method then selects the new storage volume from storage volumes that constitute one or more second or extend storage groups. If the selection from the second storage group is unsuccessful, i.e., the selection process is unable to allocate the required amount of space on an eligible volume from the second storage group, the method then performs ABEND process.

According to one aspect of the invention, the current storage volume is a member of the primary storage group. According to another aspect of the invention, the step of selecting the new volume from the extend storage group is skipped if the extend storage group is nonexistent, which would be the case if it was not so defined.

According to another aspect of the invention, the second and subsequent extend storage groups are linked as extend-to-new volume groups for end of volume encounters of storage volumes of the primary or first group. The linking procedure is performed by the administrator. During the process of defining a primary storage group, the administrator will decide whether there is a need to link an extend storage group to the primary. The definition of the primary storage group is then saved in a data set that will subsequently be accessed the ABEND manager during end of volume processing.

The computer and memory media of the present invention perform the method of the invention.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 2 depicts storage group allocations for the data processing system of FIG. 1.

DESCRIPTION OF THE PREFERRED EMBODIMENT

Figure 1:
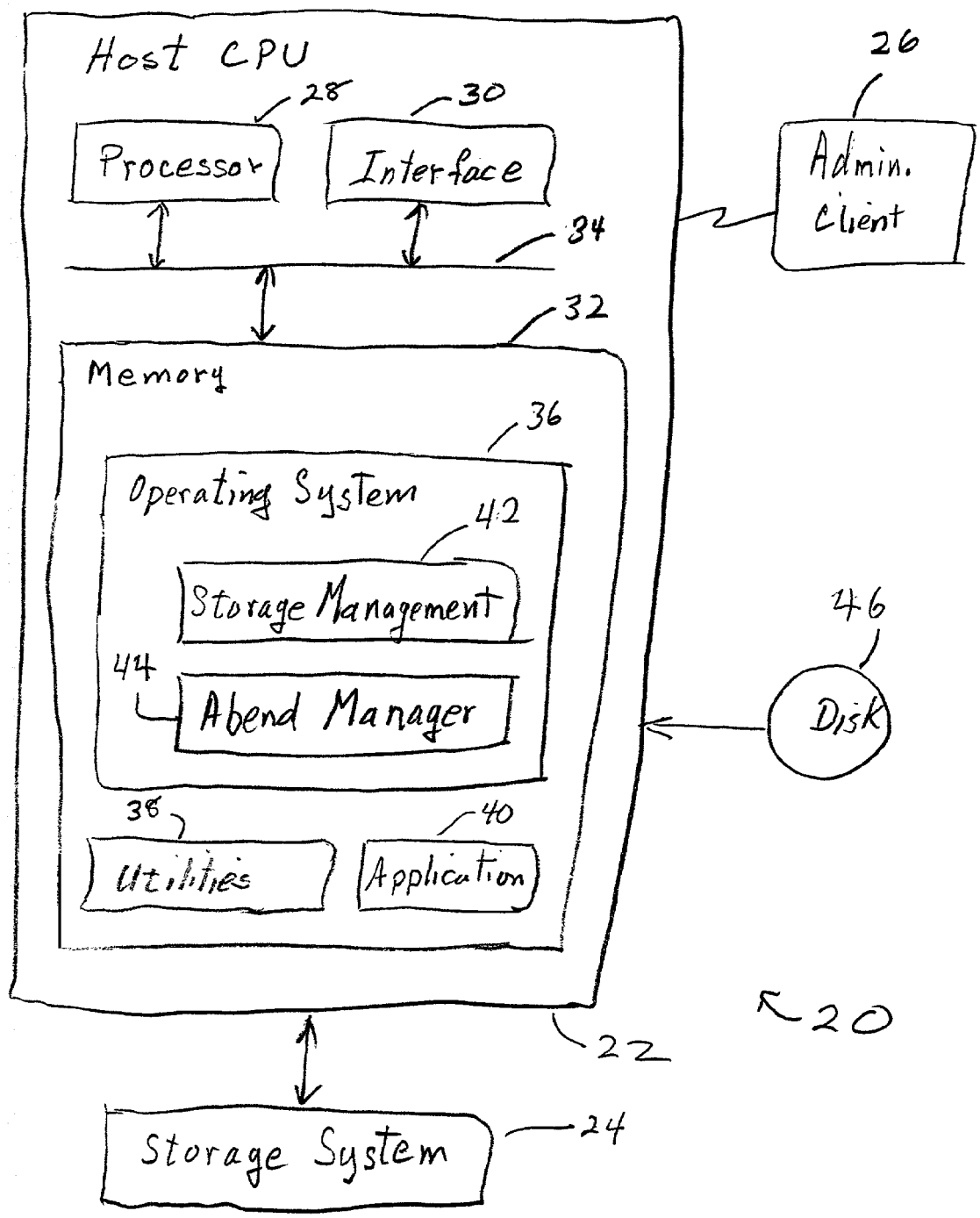
FIG. 1 is a block diagram of a data processing system of the present invention.

Referring to FIG. 1, a data processing system 20 includes a host computer 22, a storage system 24 and an administrative client 26. Host computer 22 includes a processor 28, an interface 30, a memory 32 and a bus 34. Bus 34 interconnects processor 28, interface 30 and memory 32. Memory 32 includes an operating system 36, a utilities program 38 and an application program 40. Operating system 36 includes a storage management program 42 and an ABEND manager 44. Storage management system 42 may be any suitable system that manages storage of data sets in a data processing system, such as the Storage Management Sub-system (SMS) of the IBM® Corporation. ABEND Manager 44 is extended to include the feature of the present invention that affords extend-to-new volume processing in response to end of volume encounters where space on the primary storage group has been exhausted.

Storage system 24 may comprise any suitable storage system, such as disk drives, semiconductor memory, optical memory, and the like. For example, storage system 24 may comprise a plurality of storage disks with a controller that communicates with host computer via interface 30.

A storage group and a volume may include any appropriate physical or logical unit or units, such as drive read/write heads, volumes, logical units (LUNs), controllers, logical subsystems, physical control units, data channels and paths, data directors, switches, host systems and the like.

Data that is to be assigned for storage in a particular storage resource may be any form of data, such as a data set, record, field, object, meta data, table, database, logs, files, file systems and the like. The term, "data set" is used herein in a generic sense to mean any of the data forms.

Administrative client 26 is any suitable input device that is capable of operation by an administrative person (administrator) who inputs processing rules into host computer 22 for use by operating system 36, utilities 38 and application program 40.

Data processing system 20 is capable of being interconnected with a memory media , such as a disk, 46 that contains the software code for operating system 36, utilities 38 and application 40. That is, the software contained on memory media 46 can be loaded into memory 32.

Operating system 36 is operable to cause processor 28 to execute application 40. Storage management 42 is operable to allocate logical storage volumes for use by applications, such as application 40. ABEND manager 44 is operable to permit extend processing when a job being run by application 40 encounters an end of volume flag or signal for a current storage volume being used by application 40.

The administrator using administrator client 26 supplies one or more policy rules that are used by storage management program 42 to allocate a plurality of storage volumes among a plurality of storage pools or groups, which are sometimes referred to herein as primary storage groups. Further, the policy rules have been expanded such that the administrator may extend the definitions of the primary storage groups to include one or more second-tier storage groups (also, sometimes referred to herein as extend storage groups).

Referring to FIG. 2, an exemplary allocation of nine volumes among three storage pools Pool 1, Pool 2, and Pool 3 is shown. For this example, storage management 42 operates to assign volumes V11, V12 and V13 to Pool 1, volumes V21, V22 and V23 to Pool 2 and volumes V31, V32 and V33 to Pool 3. ABEND manager 44 permits the administrator to further define Pool 1, Pool 2 and Pool 3 for extend-to-new-volume processing. To this end, Pool 1 is further defined as primary storage group 1 (SG1), Pool 2 as Extend SG2 and Pool 3 as Extend SG2. A plurality of extend storage groups (not shown) can be made available to a primary storage group for use according to a priority, whereby if space on a first extend storage group is exhausted, the new volume is selected from the next storage group according to the priority thereof and so on.

When storage management 42 assigns the data set of a job to Primary SG1, this data set is stored in a volume of Primary SG1, for example in volume V11, during normal processing by application 40. Should the job encounter an end of volume for volume V11, ABEND manager 44 continues extend to new volume processing by first trying to use either volume V12 or V13. If neither is available, ABEND manager 44 examines the policy rules established by the administrator for primary storage group SG1 to determine if an extend storage group SG2 has been defined for SG1 and if so, it will attempt to continue end of volume processing on V21, V22, V23 or V24. If any one of these volumes is available, for example, V21, space is allocated on V21 and processing of the job continues. If none of the volumes of extend storage group SG2 is available, the job is prematurely terminated (ABENDED).

An extend storage group may itself by a primary storage group. Thus, extend storage group SG1 may also be designated as primary storage group SG1 and extend storage group SG2 may also be designated as primary storage group SG2. The extend storage group capability is used only during extend-to-new volume processing and plays no role during the initial allocation of a data set of application 40. The list of candidate new volumes during extend-to-new volume processing includes volumes from both the primary storage group and the extend storage group. Extend-to-new volume processing of the present invention substantially reduces the number of ABENDs due to end of volume encounters, thereby enhancing the efficiency of data processing system 20.

Figure 3:
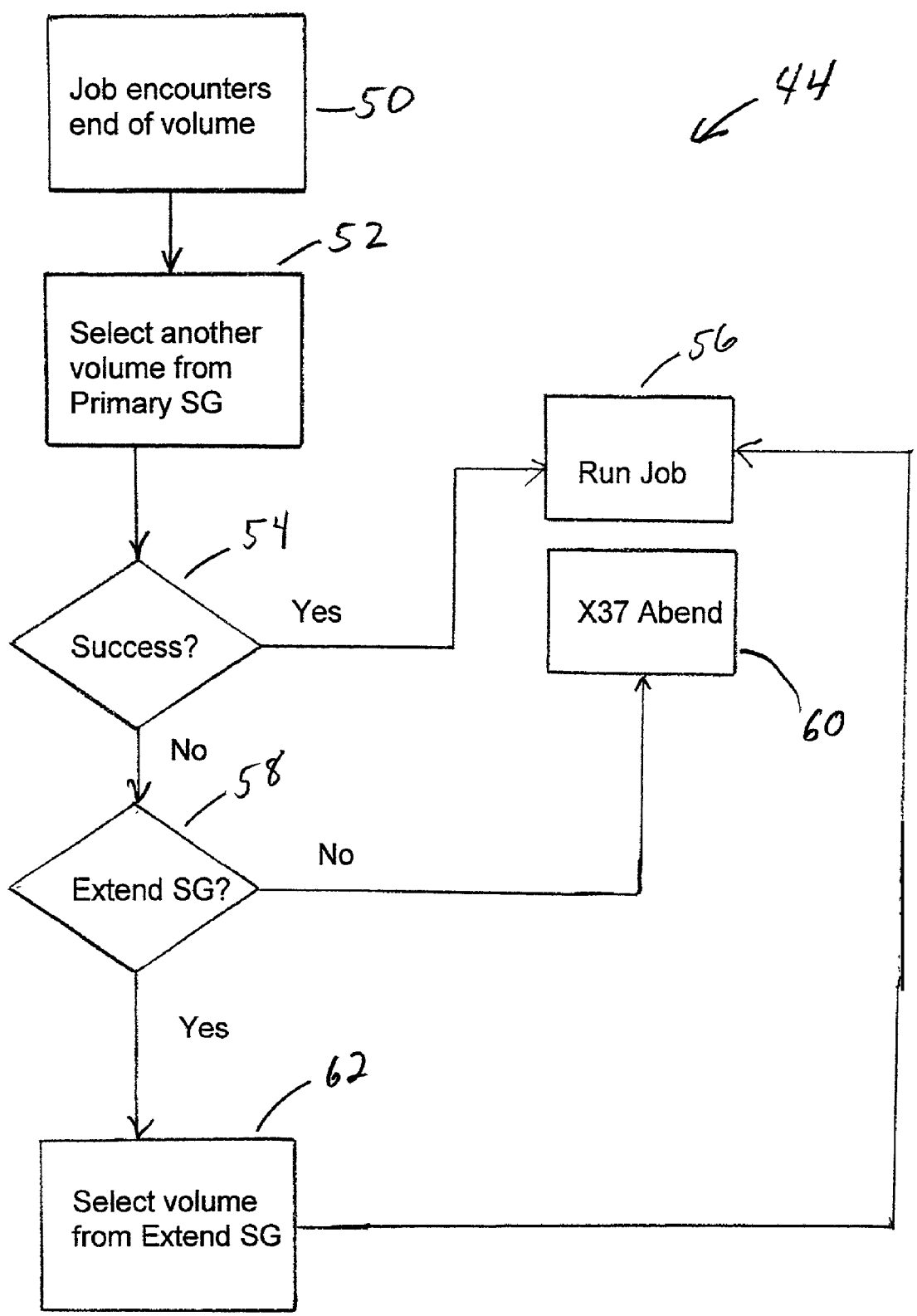
FIG. 3 is a flow diagram of the ABEND manager of the data processing system of FIG. 1.

Referring to FIG. 3, ABEND manager 44 begins extend-to-new volume processing at step 50 when it is detected that a job encounters an end of volume. Step 52 then tries to select another volume from the Primary SG. Step 54 determines if step 52 is a success. If so, step 56 permits the job to continue to run using the new volume selected by step 52. If step 54 determines that step 52 is not a success, step 58 determines if an extend SG is assigned to the primary storage group. If not, step 60 causes an ABEND to occur. If step 58 determines that there is an assigned extend storage group, step 62 selects a new volume from the assigned extend storage group. Step 56 then causes the job to continue to run using the new volume selected by step 62.

The present invention having been thus described with particular reference to the preferred forms thereof, it will be obvious that various changes and modifications may be made therein without departing from the spirit and scope of the present invention as defined in the appended claims.

What is claimed is:

1. A method for reducing ABENDs in a data processing system when a job encounters an end of a current storage volume, said method comprising:
    (a) in response to said encounter, selecting a new storage volume from a first plurality of storage volumes that constitute a first storage group;
    (b) if step (a) is unsuccessful, selecting another new storage volume from a second plurality of storage volumes that constitute a second storage group; and
    linking said second group as an extend-to-new volume group for end of volume encounters of said first plurality of storage volumes of said first group.

2. The method of claim 1, wherein said extend-to-new volume group is one of a plurality of extend-to-new volume groups, and wherein step (b) is capable of selecting said new storage volume from one or more of said plurality of extend-to-new volume groups.

3. The method of claim 2, wherein said plurality of extend-to-new volume groups is available to step (b) according to a priority.

4. A computer that reduces ABENDs when a job encounters an end of a current storage volume, said computer comprising:
    first means responsive to said encounter for selecting a new storage volume from a first plurality of storage volumes that constitute a first storage group;
    second means, operable if none of the other storage volumes of said first group are available for selection by said first means, for selecting said new storage volume from a second plurality of storage volumes that constitute a second storage group; and
    further means for linking said second group as an extend-to-new volume group for end of volume encounters of said first plurality of storage volumes of said first group.

5. The computer of claim 4, wherein said extend-to-new volume group is one of a plurality of extend-to-new volume groups, and wherein said second means is capable of selecting said new storage volume from one or more of said plurality of extend-to-new volume groups.

6. The computer of claim 5, wherein said plurality of extend-to-new volume groups is available to said second means according to a priority.

7. A computer program embodied on a computer readable memory media for causing a computer to reduce ABENDS when a job encounters an end of a current storage volume, said computer program executable by a digital processing apparatus to perform operations comprising:
    first means for controlling said computer to perform a first operation in response to said encounter of selecting a new storage volume from a first plurality of storage volumes that constitute a first storage group;

second means for controlling said computer to perform a second operation, if said first operation is unsuccessful, of selecting another new storage volume from a second plurality of storage volumes that constitute a second storage group; and further means for controlling said computer to perform a further operation of linking said second group as an extend-to-new volume group for end of volume encounters of said first plurality of storage volumes of said first group.

8. The memory media of claim 7, wherein said extend-to-new volume group is one of a plurality of extend-to-new volume groups, and wherein said second operation is capable of selecting said new storage volume from one or more of said plurality of extend-to-new volume groups.

9. The memory media of claim 7, wherein said plurality of extend-to-new volume groups is available to said second operation according to a priority.

* * * * *